United States Patent
Verma et al.

(10) Patent No.: US 12,222,122 B2
(45) Date of Patent: Feb. 11, 2025

(54) OPTIMIZED HVAC CONTROL USING DOMAIN KNOWLEDGE COMBINED WITH DEEP REINFORCEMENT LEARNING (DRL)

(71) Applicant: Tata Consultancy Services Limited, Mumbai (IN)

(72) Inventors: Sagar Kumar Verma, Pune (IN); Supriya Agrawal, Pune (IN); Venkatesh Ramanathan, Pune (IN); Ulka Shrotri, Pune (IN); Srinarayana Nagarathinam, Chennai (IN); Rajesh Jayaprakash, Chennai (IN); Aabriti Dutta, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 400 days.

(21) Appl. No.: 17/935,420

(22) Filed: Sep. 26, 2022

(65) Prior Publication Data

US 2023/0125620 A1    Apr. 27, 2023

(30) Foreign Application Priority Data

Oct. 19, 2021  (IN) .............................. 202121047480

(51) Int. Cl.
| | |
|---|---|
| G05B 13/02 | (2006.01) |
| F24F 11/63 | (2018.01) |
| F24F 120/20 | (2018.01) |

(52) U.S. Cl.
CPC .......... *F24F 11/63* (2018.01); *G05B 13/0265* (2013.01); *F24F 2120/20* (2018.01)

(58) Field of Classification Search
CPC .... F24F 11/63; F24F 2120/20; G05B 13/0265
See application file for complete search history.

(56) References Cited

U.S. PATENT DOCUMENTS

| | | |
|---|---|---|
| 2018/0100662 A1 | 4/2018 | Farahmand et al. |
| 2022/0124002 A1* | 4/2022 | Millerand ........... H04L 67/1008 |

OTHER PUBLICATIONS

Chen, Yujiao et al., "Optimal control of HVAC and window systems for natural ventilation through reinforcement learning", Energy and Buildings, Date: 2018, Publisher: Elesvier, vol. 169, pp. 195-205, https://scholar.harvard.edu/files/ychen/files/optimal_control_of_hvac_and_window_systems_for_natural_ventilation_through_reinforcement_learning.pdf.

(Continued)

*Primary Examiner* — Michael W Choi
(74) *Attorney, Agent, or Firm* — FINNEGAN, HENDERSON, FARABOW, GARRETT & DUNNER LLP

(57) ABSTRACT

HVAC control system's supervisory control is crucial for energy-efficient thermal comfort in buildings. The control logic is usually specified as 'if-then-that-else' rules that capture the domain expertise of HVAC operators, but they often have conflict that may lead to sub-optimal HVAC performance. Embodiments of the present disclosure provide a method and system for optimized Heating, ventilation, and air-conditioning (HVAC) control using domain knowledge combined with Deep Reinforcement Learning (DRL). The system disclosed utilizes Deep Reinforcement Learning (DRL) for conflict resolution in a HVAC control in combination with domain knowledge in form of control logic. The domain knowledge is predefined in an Expressive Decision Tables (EDT) engine via a formal requirement specifier consumable by the EDT engine to capture domain knowledge of a building for the HVAC control.

12 Claims, 10 Drawing Sheets

(56) References Cited

OTHER PUBLICATIONS

Wei, Tianshu et al., "Deep reinforcement learning for building HVAC control", ACM/EDAC/IEEE Design Automation Conference (DAC) Date: Jun. 2017, Date: 2017, Publisher: IEEE, https://ywang393.expressions.syr.edu/wp-content/uploads/2015/07/Deep-reinforcement-learning-for-HVAC-control-in-smart-buildings.pdf.

* cited by examiner

200

202 — receiving by an Expressive Decision Tables (EDT) engine a plurality of HVAC parameters of the building, measured for the current time instance (t), comprising: (i) a return air temperature (RAT), (ii) an occupancy count (OpCnt), (iii) an outside air temperature (OAT), (iv) an occupant discomfort measured in terms of predicted percentage dissatisfied (PPD) metric and (v) a HVAC energy consumption (EHVAC), wherein the occupant discomfort and the HVAC energy consumption is measured with respect to a previous action item (at-1) triggered at a previous time instant (t-1)

204 — analyzing, by the EDT engine, the plurality of HVAC parameters in accordance with a rule set predefined for the HVAC control of the building to determine an action space (At) comprising more than one action items (at1...atn) for the current time instant (t) corresponding to more than one rules that are satisfied from among the rule set, wherein the rule set is predefined in the EDT engine via a formal requirement specifier consumable by the EDT engine to capture domain knowledge of the building for the HVAC control, and wherein presence of more than one or more action items is indicative of presence of one or more conflicts in the domain knowledge

FIG. 2A

OPTIMIZED HVAC CONTROL USING DOMAIN KNOWLEDGE COMBINED WITH DEEP REINFORCEMENT LEARNING (DRL)

This U.S. patent application claims priority under 35 U.S.C. § 119 to Indian Patent Application No. 202121047480, filed on 19 Oct. 2021. The entire contents of the aforementioned application are incorporated herein by reference.

TECHNICAL FIELD

The embodiments herein generally relate to field of Heating, ventilation, and air-conditioning (HVAC) and, more particularly, to a method and system for optimized HVAC control using domain knowledge combined with Deep Reinforcement Learning (DRL).

BACKGROUND

Rising cost of building operations has led to an increase in research on building energy conservation measures with the goal of optimizing energy, occupant thermal comfort and indoor air quality. The energy loads in buildings are largely constituted by the heating, ventilation, and air conditioning equipment (HVAC), lighting and computing devices. Among these loads, HVAC may consume up to 50% of energy, and hence, there is a need to optimize such systems. Various techniques have been proposed to optimize HVAC performance in buildings. These techniques can be broadly categorized into: (1) Schedule-based systems are easy to realize in practice. These existing systems typically involve occupancy detection-based control. Normally, schedule-based controls are reactive and generally known to be sub-optimal in terms of energy and/or occupant comfort. (2) Model-based predictive control (MPC) has been shown to give near optimal solutions even with stochastic external disturbances. A major challenge, however, is building a well-calibrated model. Even a small error in the model was shown to give sub-optimal results. (3) Machine Learning (ML)-based approaches such as deep reinforcement learning (DRL) have been successfully used for optimal HVAC control. However, real-world implementation is a challenge due to substantial learning/exploration phase involved.

Thus, in spite of the advancements in machine learning-based and model-based controls, building automation systems (BAS) still employ the easy-to-implement rule based IFTTE (if-then-that-else) systems to strike a balance between energy consumption and occupant comfort. Typical control knobs in rule based systems include chiller temperature set points and fan speeds of air-handling (AHU)/variable-air volume (VAV) units. The rules are often written by domain experts who rely on their experience to encode some heuristics. These rules may have conflicts. More so, when the rules are subject to changes over time by the same or different operators. While the rules in silos are intended to and may perform optimally, the performance may deteriorate when there is a conflict in the control outputs. Consider, for instance, a snippet of a typical rule-based system:

R1: IF OpCnt>0 & OAT>RAT THEN flowrate=Max
R2: IF OpCnt>0 & RAT>desTemp THEN flowrate=Max
R3: IF OpCnt>0 & RAT<desTemp THEN flowrate=Max/4

In the above example, the input parameters are the outside air temperature (OAT), the occupancy count (OpCnt), the current building temperature or AHU Return Air Temperature (RAT), and the AHU desired temperature (desTemp). Clearly, the rules R1 and R3 may co-exist resulting in conflicting flowrate decisions. Thus, conflict resolution is an important problem, particularly in the context of smart buildings. Conflict resolution requires an informed decision-making process to obtain near-optimal HVAC system performance.

As mentioned, existing HVAC controls are either rule based, or ML based and come with their individual limitations. A normal practice in the rule based approaches is static and follows 'pick the first/last rule in the sequence' or 'a random rule among the conflicting rules'. Such an approach may not be energy and/or comfort optimal. Similarly, DRL-based approaches were shown to involve significant online exploration/learning duration (in the order of few years) even with off-line training. An attempt was made to utilize a simple intuition-based domain knowledge to guide RL to converge quickly. However, these approaches do not deal with complex rules or moreover conflicting intuitions, nor provide a defined formal approach to feed a set of rules to the control system. Thus, resolving conflicting intuitions to decide on control actions in HVAC remains a technical challenge.

SUMMARY

Embodiments of the present disclosure present technological improvements as solutions to one or more of the above-mentioned technical problems recognized by the inventors in conventional systems.

For example, in one embodiment, a method for optimized Heating, ventilation, and air-conditioning (HVAC) control using domain knowledge combined with Deep Reinforcement Learning (DRL) is provided. The method receives, via an Expressive Decision Tables (EDT) engine executed by the one or more hardware processors, a plurality of HVAC parameters of the building, measured for a current time instance (t). The plurality of HVAC parameters comprising: (i) a return air temperature (RAT), (ii) an occupancy count (OpCnt), (iii) an outside air temperature (OAT), (iv) an occupant discomfort measured in terms of predicted percentage dissatisfied (PPD) metric, (v) a HVAC energy consumption ($E_{HVAC}$) and (vi) a current time, wherein the occupant discomfort and the HVAC energy consumption ($E_{HVAC}$) are measured with respect to a previous action item ($a_{t-1}$) triggered at a previous time instant (t-1).

Further, the method analyzes, by the EDT engine, the plurality of HVAC parameters in accordance with a rule set predefined for the HVAC control of the building to determine an action space ($A_t$) comprising more than one action items ($a_{t1}$ . . . $a_{tm}$) for the current time instance (t) corresponding to more than one rules that are satisfied from among the rule set. The rule set is predefined in the EDT engine via a formal requirement specifier consumable by the EDT engine to capture domain knowledge of the building for the HVAC control, and wherein presence of more than one or more action items is indicative of presence of one or more conflicts in the domain knowledge.

Furthermore, the method receives, by a Deep Reinforcement Learning (DRL) agent executed by the one or more hardware processors, the action space ($A_t$), a current state ($S_t$) of the building from the EDT engine, and a current reward ($R_t$) received by the DRL agent for the previous action item ($a_{t-1}$). The current state ($S_t$) is represented by a state tuple $\{OAT_t, RAT_t, OpCnt_t, \tau\}$ comprising one or more HVAC parameters from among the plurality of HVAC parameters, and τ representing time-of-day capturing time related variations in the one or more plurality of HVAC parameters.

Thereafter, the method selects, by the DRL agent, an optimal control action item from among the action space ($A_t$) comprising the one or more action items ($a_{t1}$ ... $a_{tm}$) that resolves the conflicts by maximizing a cumulative reward received over an episode. A target cumulative reward is computed for current state action pair ($S_t$, $a_t$) providing an expected return over the episode starting from the current state $S_t$, following a policy, taking an action item $a_t$.

In another aspect, a system for optimized HVAC control using domain knowledge combined with Deep Reinforcement Learning (DRL) is provided. The system comprises a memory storing instructions; one or more Input/Output (I/O) interfaces; and one or more hardware processors coupled to the memory via the one or more I/O interfaces, wherein the one or more hardware processors are configured by the instructions to receive, via an Expressive Decision Tables (EDT) engine executed by the one or more hardware processors, a plurality of HVAC parameters of the building, measured for a current time instance (t). The plurality of HVAC parameters comprising: (i) a return air temperature (RAT), (ii) an occupancy count (OpCnt), (iii) an outside air temperature (OAT), (iv) an occupant discomfort measured in terms of predicted percentage dissatisfied (PPD) metric, (v) a HVAC energy consumption ($E_{HVAC}$) and (vi) a current time, wherein the occupant discomfort and the HVAC energy consumption ($E_{HVAC}$) are measured with respect to a previous action item ($a_{t-1}$) triggered at a previous time instant (t−1).

Further, the system analyzes, by the EDT engine, the plurality of HVAC parameters in accordance with a rule set predefined for the HVAC control of the building to determine an action space ($A_t$) comprising more than one action items ($a_{t1}$ ... $a_{tm}$) for the current time instance (t) corresponding to more than one rules that are satisfied from among the rule set. The rule set is predefined in the EDT engine via a formal requirement specifier consumable by the EDT engine to capture domain knowledge of the building for the HVAC control, and wherein presence of more than one or more action items is indicative of presence of one or more conflicts in the domain knowledge.

Furthermore, the system receives, by a Deep Reinforcement Learning (DRL) agent executed by the one or more hardware processors, the action space ($A_t$), a current state ($S_t$) of the building from the EDT engine, and a current reward ($R_t$) received by the DRL agent for the previous action item ($a_{t-1}$). The current state ($S_t$) is represented by a state tuple {$OAT_t$, $RAT_t$, $OpCnt_t$, τ} comprising one or more HVAC parameters from among the plurality of HVAC parameters, and τ representing time-of-day capturing time related variations in the one or more plurality of HVAC parameters.

Thereafter, the system selects, by the DRL agent, an optimal control action item from among the action space ($A_t$) comprising the one or more action items ($a_{t1}$ ... $a_{tm}$) that resolves the conflicts by maximizing a cumulative reward received over an episode. A target cumulative reward is computed for current state action pair (St, at) providing an expected return over the episode starting from the current state St, following a policy, taking an action item at.

In yet another aspect, there are provided one or more non-transitory machine-readable information storage mediums comprising one or more instructions, which when executed by one or more hardware processors causes a method for optimized HVAC control using domain knowledge combined with Deep Reinforcement Learning (DRL). The method receives, via an Expressive Decision Tables (EDT) engine executed by the one or more hardware processors, a plurality of HVAC parameters of the building, measured for a current time instance (t). The plurality of HVAC parameters comprising: (i) a return air temperature (RAT), (ii) an occupancy count (OpCnt), (iii) an outside air temperature (OAT), (iv) an occupant discomfort measured in terms of predicted percentage dissatisfied (PPD) metric, (v) a HVAC energy consumption (EHVAC) and (vi) a current time, wherein the occupant discomfort and the HVAC energy consumption (EHVAC) are measured with respect to a previous action item (at−1) triggered at a previous time instant (t−1).

Further, the method analyzes, by the EDT engine, the plurality of HVAC parameters in accordance with a rule set predefined for the HVAC control of the building to determine an action space ($A_t$) comprising more than one action items ($a_{t1}$ ... $a_{tm}$) for the current time instance (t) corresponding to more than one rules that are satisfied from among the rule set. The rule set is predefined in the EDT engine via a formal requirement specifier consumable by the EDT engine to capture domain knowledge of the building for the HVAC control, and wherein presence of more than one or more action items is indicative of presence of one or more conflicts in the domain knowledge.

Furthermore, the method receives, by a Deep Reinforcement Learning (DRL) agent executed by the one or more hardware processors, the action space (At), a current state (St) of the building from the EDT engine, and a current reward (Rt) received by the DRL agent for the previous action item (at−1). The current state (St) is represented by a state tuple {$OAT_t$, $RAT_t$, $OpCnt_t$, τ} comprising one or more HVAC parameters from among the plurality of HVAC parameters, and τ representing time-of-day capturing time related variations in the one or more plurality of HVAC parameters.

Thereafter, the method selects, by the DRL agent, an optimal control action item from among the action space (At) comprising the one or more action items (at1 ... atn) that resolves the conflicts by maximizing a cumulative reward received over an episode. A target cumulative reward is computed for current state action pair (St, at) providing an expected return over the episode starting from the current state St, following a policy, taking an action item at.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 2A and 2B (collectively referred as FIG. 2) is a flow diagram illustrating a method for optimized HVAC control using domain knowledge combined with Deep Reinforcement Learning (DRL), using the system of FIG. 1, in accordance with some embodiments of the present disclosure.

Figure 1A:
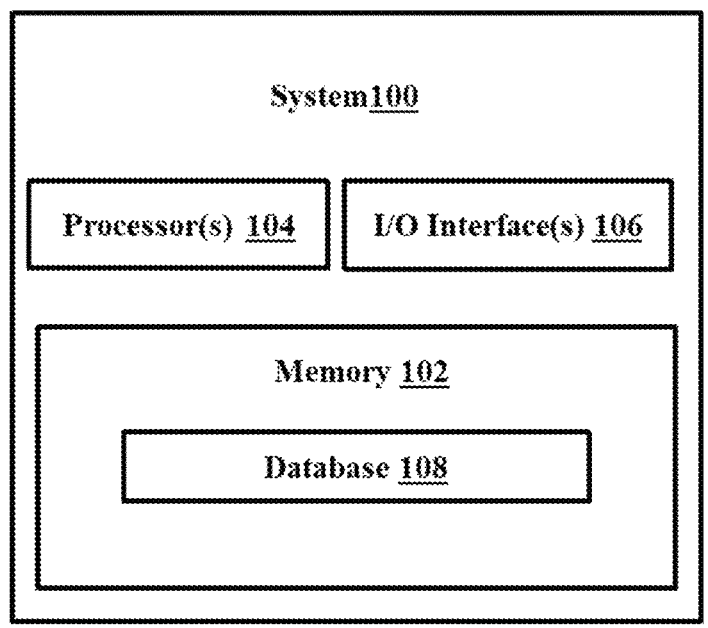
FIG. 1A is a functional block diagram of a system for optimized Heating, ventilation, and air-conditioning (HVAC) control using domain knowledge combined with Deep Reinforcement Learning (DRL), in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Heating, ventilation, and air-conditioning (HVAC) control system's supervisory control is crucial for energy-efficient thermal comfort in buildings. The control logic is usually specified as 'if-then-that-else' rules that capture the domain expertise of HVAC operators, but they often have conflicts that may lead to sub-optimal HVAC performance.

Embodiments of the present disclosure provide a method and system for optimized Heating, ventilation, and air-conditioning (HVAC) control using domain knowledge combined with Deep Reinforcement Learning (DRL). The system disclosed utilizes Deep Reinforcement Learning (DRL) for conflict resolution in a HVAC control in combination with domain knowledge in form of control logic. Thus, unlike state of the art approaches, the method disclosed enables to exploit conflicting intuitions to converge quickly to optimal control policy. The domain knowledge is predefined in an Expressive Decision Tables (EDT) engine via a formal requirement specifier consumable by the EDT engine to capture domain knowledge of a building for the HVAC control. Unlike the method disclosed, hardly any state of art techniques have explored utilizing domain knowledge encoded in a formal manner with DRL to feed the rules to control system for optimal HVAC control in buildings by resolving conflicting rules.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1A is a functional block diagram of a system 100 for optimized Heating, ventilation, and air-conditioning (HVAC) control using domain knowledge combined with Deep Reinforcement Learning (DRL), in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 1B:
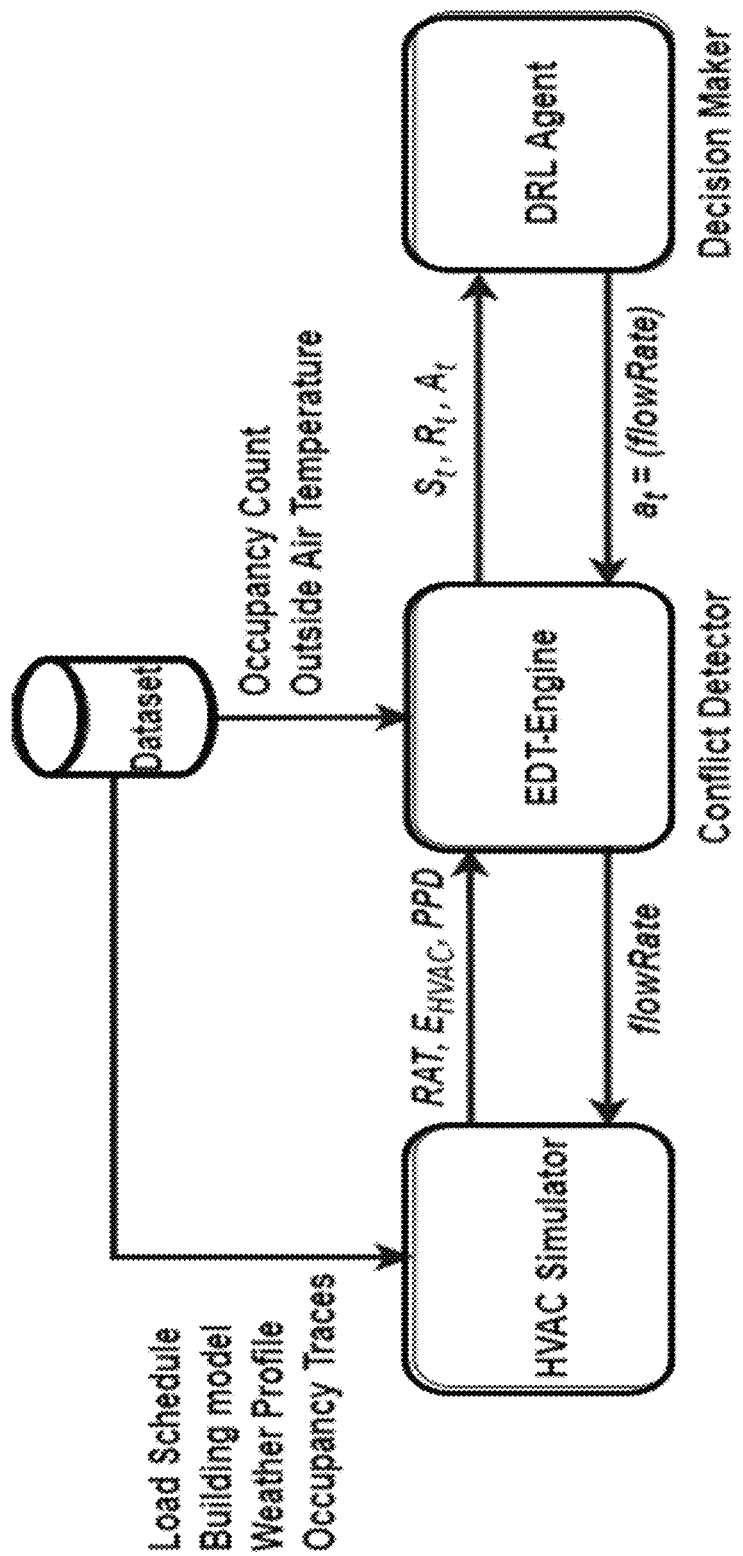
FIG. 1B illustrates an example process and architectural overview of the system of FIG. 1 using a HVAC simulator of a building, in accordance with some embodiments of the present disclosure.

Further, the memory 102 includes a database 108 that stores the collection of remotely sensed images to be analyzed, the labelled images detected with the properties of interest and the like. Further, the memory 102 includes modules such as the EDT engine (as depicted in FIG. 1B) for storing and executing the rule set representing the domain knowledge of the building for HVAC control, the DRL agent (as depicted in FIG. 1B) for resolving one or more conflicts present post executing the rule set. Further, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of the system 100 are explained in conjunction FIG. 1B through FIG. 6.

FIG. 1B illustrates an example process and architectural overview of the system of FIG. 1 using a HVAC simulator of a building, in accordance with some embodiments of the present disclosure. As depicted in FIG. 1B, a plurality of HVAC parameters are received by the EDT engine via a HVAC simulator and an input dataset. However, it can be understood that in real time applications, the plurality of HVAC parameters are received from one or more sensors and computational units for HVAC control of the building. Thus, the input dataset provides HVAC parameters such as occupancy count (OpCnt) and outside air temperature (OAT) for every minute etc. An Energy plus (E+)™ (HVAC simulator) observes previous state using the OpCnt, the OAT and an action item flowrate computed by the DRL agent, interchangeably referred to as RL agent, for a previous time instant, that is applied to the HVAC simulator. Further, the HVAC simulator computes, a Return Air Temperature (RAT), an occupant discomfort measured in terms of predicted percentage dissatisfied (PPD) metric, and Energy Consumption ($E_{HVAC}$) for the next time-step. Further, a current state (S) of the building is defined based one or more of HVAC parameters. Also, the rule set is executed by the EDT engine to compute conflicting action items (defining the flowrates of air in the HVAC simulator). The conflicting action items (flow rates) are passed to the DRL agent, which calculates an immediate reward function by combining the occupant discomfort and the energy consumption computed. Further, the current state (S) is fed to a to Q-Network by the RL agent to get an output corresponding to every conflicting flowrate. The output of Q-Network is used to determine the action item (flowrate), which must be fired from the conflicting actions. FIG. 1B is better understood in conjunction with steps of method 200 depicted in FIG. 2

Figure 2B:
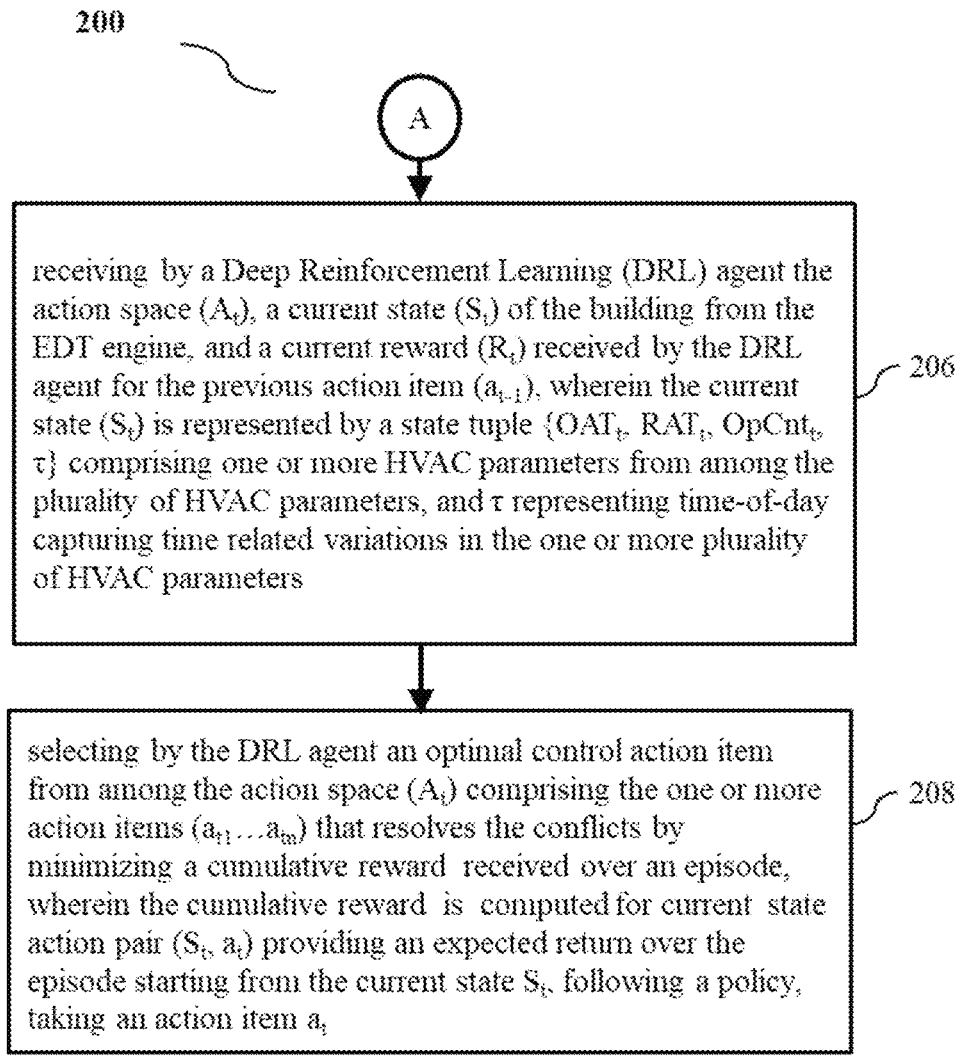

FIGS. 2A and 2B (collectively referred as FIG. 2) is a flow diagram illustrating a method 200 for optimized HVAC control using domain knowledge combined with Deep Reinforcement Learning (DRL), using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIGS. 1A and 1B and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, at step 202 of the method 200, the Expressive Decision Tables (EDT) engine executed by the one or more hardware processors 104, receives a plurality of HVAC parameters of the building, measured for the current time instance (t). The HVAC parameters are received via the I/O interface that connect external sensors that capture environmental conditions in the building. In an alternative implementation due to Air Handling Unit's (AHU's) restrictions, and there is limitation in getting direct measurements of the HVAC parameters, the system 100 is tested via the HVAC simulators, such as E+™ models. The HVAC parameters comprise: (i) the return air temperature (RAT), (ii) the occupancy count (OpCnt), (iii) the outside air temperature (OAT), (iv) the occupant discomfort measured in terms of predicted percentage dissatisfied (PPD) metric and (v) a HVAC energy consumption ($E_{HVAC}$). The occupant discomfort and the HVAC energy consumption is measured with respect to a previous action item ($a_{t-1}$) triggered at a previous time instant (t−1). Further, the HVAC parameters also include another variable, that enables specifying current time instance (currTime) for an episode or a day.

At step 204 of the method 200, the EDT engine executed by the one or more hardware processors 104 analyzes the plurality of HVAC parameters in accordance with a rule set predefined for the HVAC control of the building to determine an action space ($A_t$). The action space ($A_t$) comprises more than one action items ($a_{t1} \ldots a_{tm}$) for the current time instant (t) corresponding to more than one rules that are satisfied from among the rule set. The rule set is predefined in the EDT engine via a formal requirement specifier consumable by the EDT engine to capture domain knowledge of the building for the HVAC control. Domain knowledge is captured in rules and rules are usually described using a combination of natural language and system state-based paradigm. The method 200 leverages Expressive Decision Tables (EDT) notation in the literature that was specifically designed for verification of the rules. It can be understood that more than one rules may be true due to obvious conflicts in domain knowledge, which thus raises conflicts in HVAC control action. EDT is a user-friendly tabular notation to formally specify requirements of reactive systems as a relationship between inputs and outputs. It is regular expression based and provides a uniform notation to compactly specify state, sequence, and timing-based requirements of reactive systems. An EDT specification consists of tables where column headers specify inputs, local and outputs variable. Rows of the table specify requirements as relationships between patterns of input and output variable values and can also be used for test generation.

An example EDT used by the system 200 is explained herein through partial requirements of the system 100 for optimized HVAC control in conjunction with FIG. 1B that utilizes the HVAC simulator for illustration purpose as follows:

1) At every time-step, current time (currTime) is incremented by 1 and return air temperature (RAT), HVAC energy consumption (EHVAC), and occupant discomfort (PPD) metric are calculated through function calls made to a building energy simulator.
2) If occupancy count (OpCnt) is greater than 0 and outside air temperature (OAT) is greater than RAT, set flowrate to maximum, that is, 20 kg/s.
3) If OpCnt is greater than 0 and RAT is less than the desired temperature, desTemp (25° C.), set flowrate to 5 kg/s.
4) If OpCnt is 0 for a long time, say more than 7200 seconds (2 hours), switch off HVAC, that is, set flowrate to 0 kg/s. This indicates, rule involving time based components.

The above requirements, in that order, are specified by the EDT in table 1 below, where each row maps directly to one of the requirements. In column header, column names under the keyword IN: RAT, currTime, OAT and OpCnt are input variables, whereas those under the keyword OUT: flowrate, currTime, EHVAC, PPD and RAT are output variables.

Since RAT and currTime are both input and output variables, they are referred to as local variables. Each cell of an input variable column consists of a conditional expression. The cell is said to match when the condition corresponding to that cell evaluates to True and a row is said to match when it is all non-empty cells match. Thus, row 2 of table 1 matches when the current value of OAT is greater than RAT and OpCnt is greater than zero. A conditional expression may also include time. For example, the expression in row 4 of column OpCnt evaluates to True if OpCnt has remained 0 for 2 hours (hrs) as specified by 0{>=7200s}. Once a row matches, the expressions in the output columns of that row are evaluated and the resulting value is assigned to the variable corresponding to that column. Thus, when row 2 of table 1 matches, the value of flowrate is set to 20 kg/s, and when row 1 matches, then the values of EHVAC, PPD, and RAT are computed by invoking appropriate simulator functions.

TABLE 1

| | IN | | | | | | OUT | | |
|---|---|---|---|---|---|---|---|---|---|
| 1 | RAT | currTime | OAT | OpCnt | flow Rate | currTime | $E_{HVAC}$ | PPD | RAT |
| 2 | | <1439{=60 s} | >0 | | | currTime + 1 | CalcEnergy( ) | CalcDiscomfort( ) | CalcRAT( ) |
| 3 | | | >RAT | >0 | 20 | | | | |
| 4 | <25 | | | >0 | 5 | | | | |
| 5 | | | | 0{>=7200 s} | 0 | | | | |

Definition 1 (Conflict between rules): Two rows $R_i$ and $R_j$ are said to conflict, denoted as $R_i \# R_j$, if both rows can match simultaneously and $R_i$ and $R_j$ perform different updates on at least one output variable. In the specification given in table 1, rows 2 and 3 can match when OpCnt>0 and RAT<25° C. and OAT>RAT. This will result in an assignment of conflicting values, 20 kg/s and 5 kg/s by rows 2 and 3 respectively, to flowrate.

EDT engine highlights such conflicts between the rules as shown in table 2. Note that, while other formal requirement specifiers such as SCR and stream-based tables may work, the method 200 leverages EDT here for its superior performance in terms of uniformity, ease of use, and scalability with in-built support to connect external C++ programs or databases.

At step 206 of the method 200, the DRL agent executed by the one or more hardware processors 104 receives the action space $(A_t)$, a current state $(S_t)$ of the building from the EDT engine, and a current reward $(R_t)$ received by the DRL agent for the previous action item $(a_{t-1})$.

TABLE 2

| Time(Min) | Inputs | Outputs | Remarks |
|---|---|---|---|
| 0 | OpCnt = 0 | | |
| 1 | OpCnt = 5 | | |
| 1 | OAT = 32° C. | | |
| | | currTime = 2 | Row1 output |
| | | RAT = 22° C. | Row1 output |
| | | flowrate = 20 Kg/s | Row2 output |
| | | flowrate = 5 Kg/s | Row3 output |

The current state $(S_t)$ is represented by a state tuple $\{OAT_t, RAT_t, OpCnt_t, \tau\}$ comprising one or more HVAC parameters from among the plurality of HVAC parameters, and $\tau$ representing time-of-day capturing time related variations in the one or more plurality of HVAC parameters.

At step 208 of the method 200, the DRL agent executed by the one or more hardware processors 104 selects an optimal control action item from among the action space (At) comprising the one or more action items $(a_{t1} \ldots a_{tm})$ that resolves one or more conflicts by maximizes a cumulative reward received over an episode. The cumulative reward is computed for current state action pair $(S_t, a_t)$ providing an expected return over the episode starting from the current state $S_t$, following a policy, taking an action item $a_t$. The target cumulation reward comprises a) an immediate reward component computed based on an energy consumption reward component $(R_C)$ and an occupant discomfort component $(R_E)$ and b) second component comprising a neural networks approximation of maximum cumulative reward that is expected from the next state that is $S_{(t+1)}$.

Immediate award for a successive time instant $(_{t+1})$ is defined by $R_{t+1} = \alpha R_C + (1-\alpha) R_E$, wherein $\alpha$ is a tuning factor balancing control setting between energy saving and occupant discomfort. The $R_C$ is based on ratio of the HVAC energy consumption $(E_{HVAC})$ computed for the successive time instant to a rated maximum HVAC energy consumption as a result of taking action $(a_t)$ to a rated maximum HVAC energy consumption. The $R_E$ is based on the ratio of the occupant discomfort for the successive time instant to a maximum allowed occupant discomfort as a result of taking action $(a_t)$ to a maximum allowed occupant discomfort. The DRL agent is trained using a deep Q-Network (DQN) for selecting the optimal control action by applying an iterative process using episodic-epoch based learning over an truncated action space (A), a state (S) and the immediate reward corresponding to action item (a) taken from a previous state received from the EDT engine. The DQN, which is a neural network, approximates an action-value function (Q-value) for the state (S) in each iteration returning the expected cumulative discounted reward over an episode starting from the state 'S', following the policy, taking the action item a. Further, the control action is selected by providing preference to a highest Q-value based on a ε-greedy policy. Above mentioned iterative process is applied over two DQNs comprising a policy network Q and a target network $\bar{Q}$ to choose action and approximate target cumulative reward, respectively.

Actions of the DRL agent and the training of the DRL agent is explained in conjunction with process and architectural overview depicted in FIG. 1B.

Key concepts of HVAC control: The main goal of HVAC equipment is to ensure occupant comfort. An ideal HVAC controller achieves this goal with minimum energy consumption. The controller modulates HVAC fan speed, resulting in a change in room temperature that meets occupant comfort. This process can be modelled as a Markov Decision Process (MDP), making it a natural candidate for RL.

Control action: A building space is considered with an AHU capable of modulating the supply air fan speed. In an example scenario, a supply fan equipped with a stepper motor where the fan speed varies in a few discrete steps is assumed. The action space is given by, $a_t = \{\dot{m}_t\}$, where $\dot{m}_t$ refers to flowrate at time t.

System state: The system state at time t is given by, $S_t=\{OAT_t, RAT_t, OpCnt_t, \tau\}$ Incorporating time-of-day T in the state-space helps RL agent capture time related variations in the features. For instance, OAT naturally has a trend of rise-peak-fall over the course of the day. To this end, one-hot encoding of length three is used for $\tau$ (morning, afternoon, and evening). Alternatively, forecasted values of such features may also be incorporated in the state-space.

Immediate Reward (R): The agent takes a control action at upon observing St. This action results in environment evolving to a new state St+1 and an immediate reward $R_{t+1}$. Since the objective of the RL agent is to minimize both occupant discomfort and energy consumption, the reward function for the immediate reward is defined as:

$$\begin{cases} \alpha R_C + (1-\alpha)R_E, & \text{if } 6 < PPD_{t+1} < 15 \\ P_1, & \text{if } PPD_{t+1} > 20 \\ P_2, & \text{if } 15 \leq PPD_{t+1} \leq 20 \\ A, & \text{if } PPD_{t+1} \leq 6 \end{cases} \quad (1)$$

where, $$R_C = \left[1 - \frac{E_{HVAC}^{t+1}}{E_{HVAC}^{rated}}\right] \text{ and } R_E = \left[1 - \frac{PPD_{t+1}}{PPD_{max}}\right] \quad (2)$$

Where, $\alpha$, P1, P2 and A are parameters chosen arbitrarily as 0.5, −5, −3, and 1.5, respectively. In above equations, $E_{HVAC}^{t+1}$ and $PPD^{t+1}$ 1 represent the immediate energy consumption and occupant discomfort as a result of taking the action at. $E_{HVAC}^{rated}$ and $PPD_{max}$ are the rated (maximum) energy consumption of the HVAC equipment and maximum occupant discomfort possible, respectively. While $E_{HVAC}^{rated}$ depends on the HVAC equipment under consideration, $PPD_{max}=95\%$ by definition.

Architecture: As depicted in example architecture of FIG. 1B, the system 100 employs a co-simulation architecture that connects the HVAC simulator, for example E+™, the EDT-Engine, and the DRL agent. These components exchange information at every time-step. E+ is a building energy simulation tool that models the energy consumption for HVAC, lighting, and other electrical loads. In a practical/real time application the parameters currently provided by the HVAC simulator are acquired vis corresponding sensors for each parameter. However, the HVAC simulator in real time applications will be replaced by sensors providing the HVAC parameters for the EDT engine and DRL agent to process and determine the optimal control action. In this example architecture comprising the HVAC simulator, the environment's state $S_t$ of the building is observed or obtained from the input dataset and a flowrate, computed by EDT engine, as control input and computes RAT, PPD, and EHVAC in the next time-step. EDT engine operates on an EDT defining the rule set and computes one or more set of conflicting flowrates based on the current OpCnt and OAT, and RAT as returned by E+. The DRL agent decides a control action, at based on the policy learnt so far, from a truncated set of feasible action space (set of flowrates computed by EDT), upon observing St and reward Rt as computed by the immediate reward function. The control action decided by the DRL agent is passed to the HVAC simulator through the EDT engine, and the cycle repeats.

DRL agent training process: At each time t, the DRL agent acts (at) directly on the environment and receives the immediate reward $R_{t+1}$ along with a new state $S_{t+1}$. The goal of the agent is to learn an optimal policy that maximizes the expected cumulative reward. The episodic-epoch version of learning is used, where each episode is a day and each epoch is one minute. In a practical example scenario, only working hours of the building are considered, thus an episode consists of 540 epochs. Each episode ends in a special state called the terminal state, followed by a reset to an original starting state. The DQN is used to approximate the action-value function represented by (Q-value). The action-value de-notes the expected return (discounted rewards) over an episode starting from state (S), following a policy, taking action (a). The DQN receives the state as an input value and outputs the Q values for all possible actions. A pseudo code or algorithm 1, used for training the DRL agent for selecting optimal control action is provided below.

---

Algorithm1: RL agent of system 100

Parameters:
1 nEpisodes //No. of episodes
2 nEpochs //No. of simulation steps per episode
3 $\in_{min}$ // min ∈ VALUE
4 N //Control Time step
5 K // target network update frequency
INPUTS:
6 S,A //State-space and action-space
7 Λ =[empty set] //Initialize replay buffer
8 Initialize policy network: Q with random weights θ
9 Initialize target network: $\overline{Q}$ with random weights $\overline{\theta} = \theta$
10 Inititalize states, action, action-space, $S_2$, $S_1$, $a_1$, $A_1$
11 for e=1 to nEpisodes do
12   Reset environment, ($S_2$, $S_1$, $a_1$, $A_1$) = reset( ) E+
13   $\in = \max(\in - \Delta\in, \in_{min})$,
14   for t = 1 to nEpochs do
15     if t(mod) N==0 then
16       ($S_{t+1}$, $R_{t+1}$) = observe E+($a_t$)//action space for $S_{t+1}$
17       $A_{t+i}$ ← Get truncated action space from EDT
18       Store ($S_t$, $a_t$, $S_{t+1}$, $R_{t+i}$,$A_{t+i}$) in Λ
19       Draw mini-batch sample transitions ($S_j$, $a_j$, $S_{j+1}$, $R_{j+1}$, $A_{j+1}$) from Λ
20       Target ($S_j$, $\alpha_j$) = $R_{j+1}$ + ⊠ * $\max_{a^* \in A_{j+1}} \overline{Q}(S_{j+1}, \alpha^*)$
21       Train Q(.|θ with $S_j$ and target ($\alpha^* \in A_{j+1} S_j$, $\alpha_j$)
       // choose action using ∈ − greedy 22     $a_{t+1} = \begin{cases} \text{Sample from } A_{t+1}, \text{ probability } \in \\ \text{argmax } Q(S_{t+1}, \alpha^*), \text{ otherwise} \\ \quad \alpha^* \in A_{t+1} \end{cases}$ 23     $S_t = S_{t+1}$
24     $\alpha_t = \alpha_{t+1}$
25     end if
26     E+ ← EDT ← $\alpha_t$ // execute action in the building
27   end for
28   update target network every K episodes, $\overline{\theta} = \theta$
29 end for

---

A number of episodes nEpisodes are decided depending on learning duration, number of epochs nEpochs, and $\in_{min}$ required for the ∈-greedy exploration and exploitation. The nEpochs refer to the simulation time-step and is the same as the number of interactions between the EDT and the HVAC simulator per episode. Next, a replay buffer is initialized to an empty set followed by initializing the policy network Q and the target network $\overline{Q}$ with the same random weights (Lines 7-9). At the start of every episode, the environment is reset to the same initial state and E is decayed linearly (Lines 12, 13). As the simulation progresses, at every control step, the state and the immediate reward are observed (Line 16). A truncated action space from EDT on Line 17 is received. Next, the most recent transition tuple ($S_t$, $a_t$, $S_{t+1}$, $R_{t+1}$, $A_{t+1}$) are accumulated in the replay buffer. A randomly chosen, set of tuples (mini-batch), is used in the target value calculation (Line 19). For every entry in the mini-batch, the target values are computed using Line 20 using target neural networks. Further, these target values along with the states vector is used for training the policy network (Line 21). An ADAM back-propagation method known in literature is used. An action is chosen based on the E-greedy policy (Line 22). This new action is passed to the HVAC simulator if it is a control step, else the previous action is retained. Last, the weights of the target network are updated with the policy network weights (Line 28) after every K episodes. In experiments conducted, the target network is updated every 2 episodes.

Equation 3 below provides mathematical representation of components of the target cumulative reward, which is the immediate reward plus the neural networks' approximation of maximum cumulative reward one can expect from the next state that is $S_{t+1}$.

$$Q(S_t, a_t) = R_{t+1} + \boxed{?} * \max_{a^* \in A_{t+1}} Q(S_{t+1}, a^*) \quad (3)$$

DQN architecture: Since the state space features can take a wide range of values, to improve convergence, the features are scaled to the range [0,1] using min-max normalization. The input layer and each of the three hidden layers have 6 and 10 nodes, respectively. The output layer for the flowrate (action items of the action space) has 5 nodes. A Rectified Linear Unit (ReLU) activation function is used for the hidden layers and the output Q-value is estimated using the linear function. A Random-Uniform initialization is used for the weights and bias of the network.

Thus, the method and system disclosed herein reduces learning duration by combining rule-based domain knowledge and DRL-based control in and in this process, resolves any conflicts that may be present in the domain knowledge encoded using a formal requirement specifier.

EXPERIMENTAL RESULTS AND OBSERVATIONS: A major challenge in real-world implementation of the system is access to override the existing Air Handling Unit's (AHU's) control logic, which is proprietary. Therefore, the system 100 is evaluated through simulations using a calibrated HVAC simulator for HVAC control (E+™) model of the building. The building thermal dynamics are calibrated with the data normally available in a Building Automation Systems (BAS).

A. Experimental Set-up: A 20,000 square feet (1860 m²) real-world office layout is considered, which is served by an AHU with cooling capacity as 80 TR at a rated speed of 36,000 CFM (20 kg/s). The efficacy of the system 100 is evaluated through a co-simulation framework involving BCVTB that establishes the connection between the HVAC simulator, EDT engine and the DRL agent training process. A list of all possible rules is obtained from a building administrator. Specifically, there are 22 rules that would set the flowrate to (0, 25, 50, 75, 100)% of the rated speed, resulting in flowrate values of (0, 5, 10, 15, 20) kg/s. Further, the rules are translated to EDT rows. The system 100 is trained over 364 days (1 year) data. The occupancy logs for the training days are obtained from the BAS at 15 mins interval and it is assumed that the occupancy is constant within 15 mins. Further, the weather data is obtained using an open-source weather API at 1 hour (hr) interval. Within 1 hr, the ambient parameters are linearly interpolated. The system 100 trained over one year data is compared with the following baselines:

BL1-EDT without learning: In this baseline, all rules are executed in sequence by EDT at every time-step and a rule that meets its criterion is picked. In case of a conflict, a rule is picked at random. The experiment is repeated five times with different random seeds; and the average energy consumption and comfort are reported. BL2-DRL: Here, the standard DQN is implemented with AHU fan flowrate as the action space. For comparison purpose, this baseline has been trained over one year, two years and four years data. The reinforcement learning parameters used for the experiments in BL2 and the system 100 are $\in_{min}=0.1$, learning rate $\alpha=0.01$, and discount factor $\gamma=0.9$. Performance metrics: The average person-discomfort, average (PPD 100·OpCnt) and total HVAC energy consumption over the testing duration (three months) are the metrics used for evaluation. The clothing insulation, metabolic rate, and local air velocity that are required for PPD calculation are kept constant at 0.5 Clo, 1.2 Met and 0.1 m/s, respectively. The PPD is reported as percentage (%). The simulation time-step in E+™ is 1 min and the control time-step is 5 mins.

Figure 3:
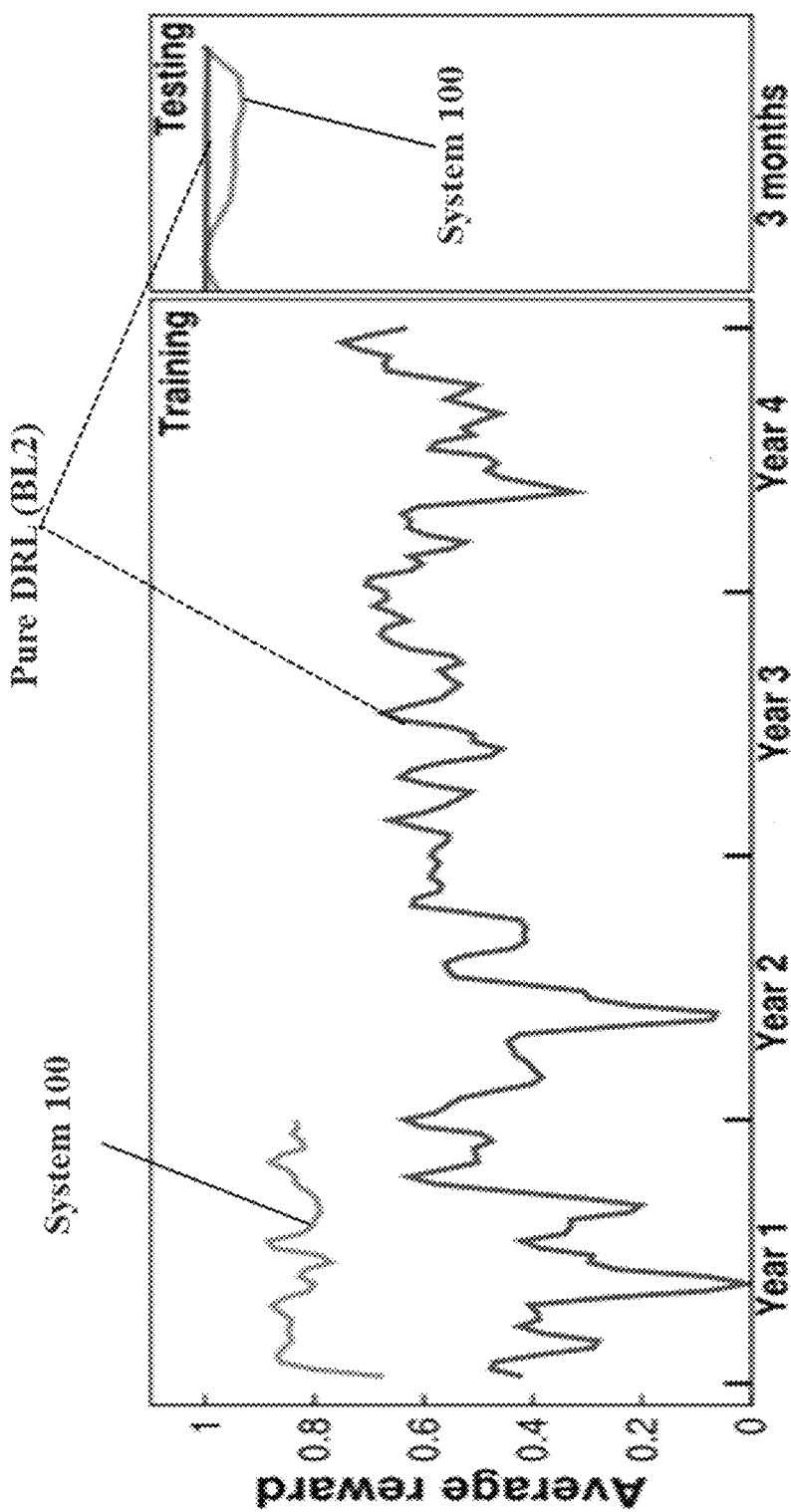
FIG. 3 is a graphical illustration depicting learning convergence of the system over the conventional DRL approach for HVAC control, in accordance with some embodiments of the present disclosure.

B. Experimental Results and analysis: Convergence: BL2 (Only DRL based approach) and the system 100 use the same DQN architecture and hyper parameters. The convergence of the learning is shown in FIG. 3. BL2 has been trained over four years data, while the system 100 is trained over one year data. Both the approaches have been tested for three months. The X-axis represents the epochs and Y-axis represents the weekly averaged reward. BL2's reward starts at a low reward. Note that by definition (Equation 1), average reward may take negative values. We have normalized the average reward in FIG. 3 to the range [0,1]. As the DRL agent learns, the solution steadily improves with epochs (moves closer to 1.0). Note that BL2 has to learns from scratch and involves substantial exploration phase. However, it is observed that the system 100 starts at a relatively higher reward and is steadily maintained throughout the one year learning period. In case of the system 100, the pruned actions through the domain knowledge encoded in the form of rules, help guide the agent quickly to optimal policy. Further, it is observed that in the testing period (exploitation), both BL2 and the system 100 give similar rewards indicating that the agents have converged to similar control policy.

Figure 4A:
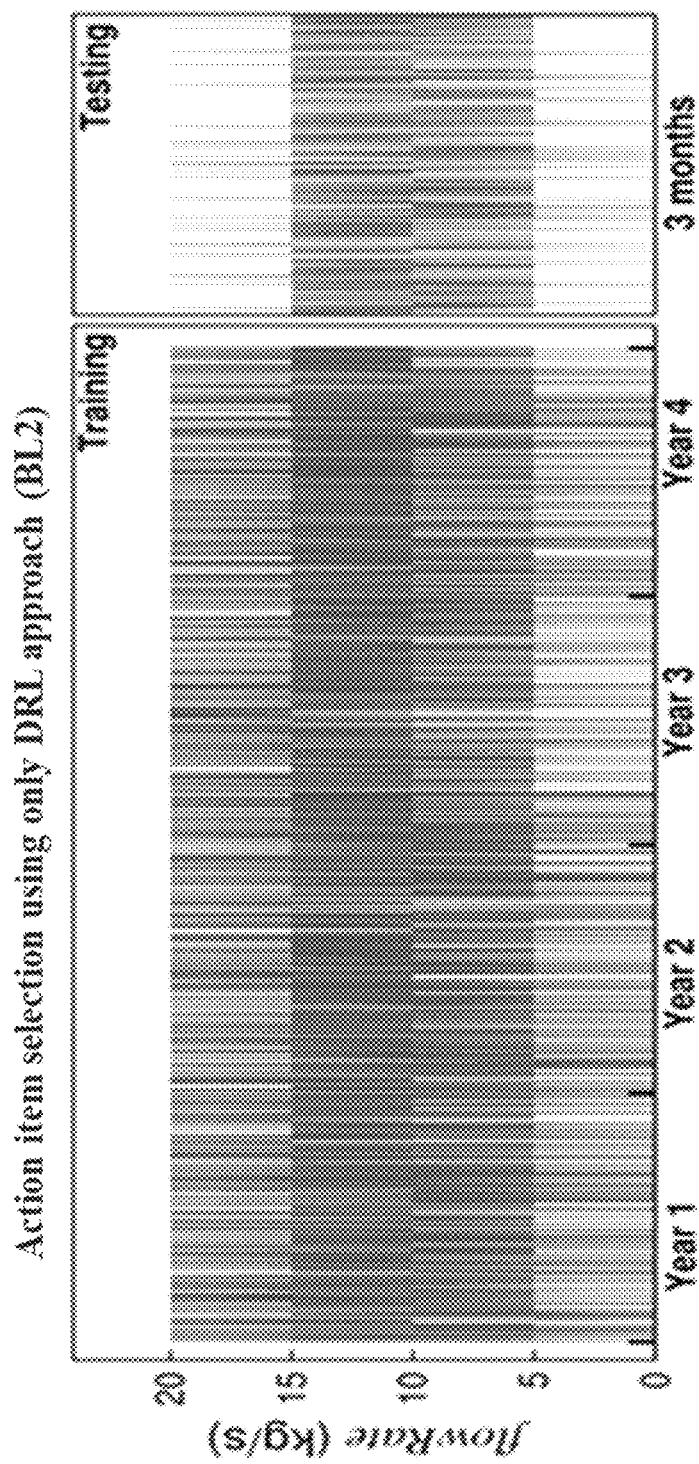
FIGS. 4A and 4B are graphical illustrations of comparative analysis of the system and a conventional DRL approach for action item selection during HVAC control, in accordance with some embodiments of the present disclosure.
Figure 4B:
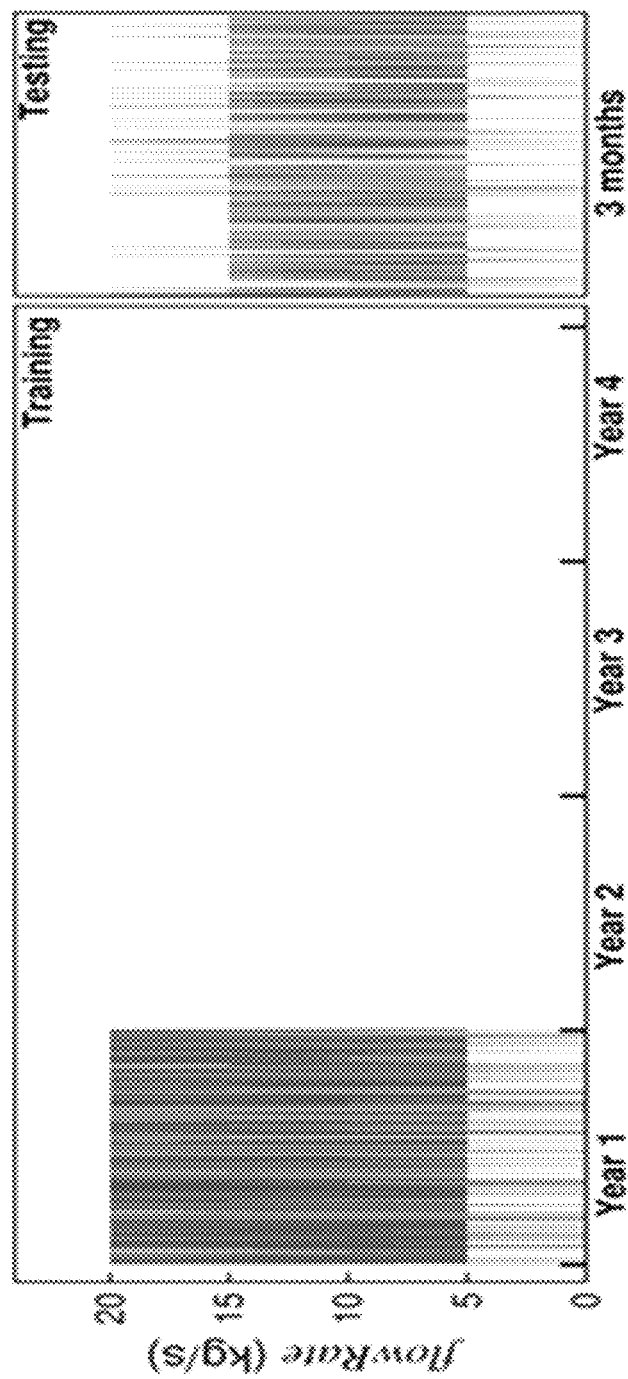
Figure 5A:
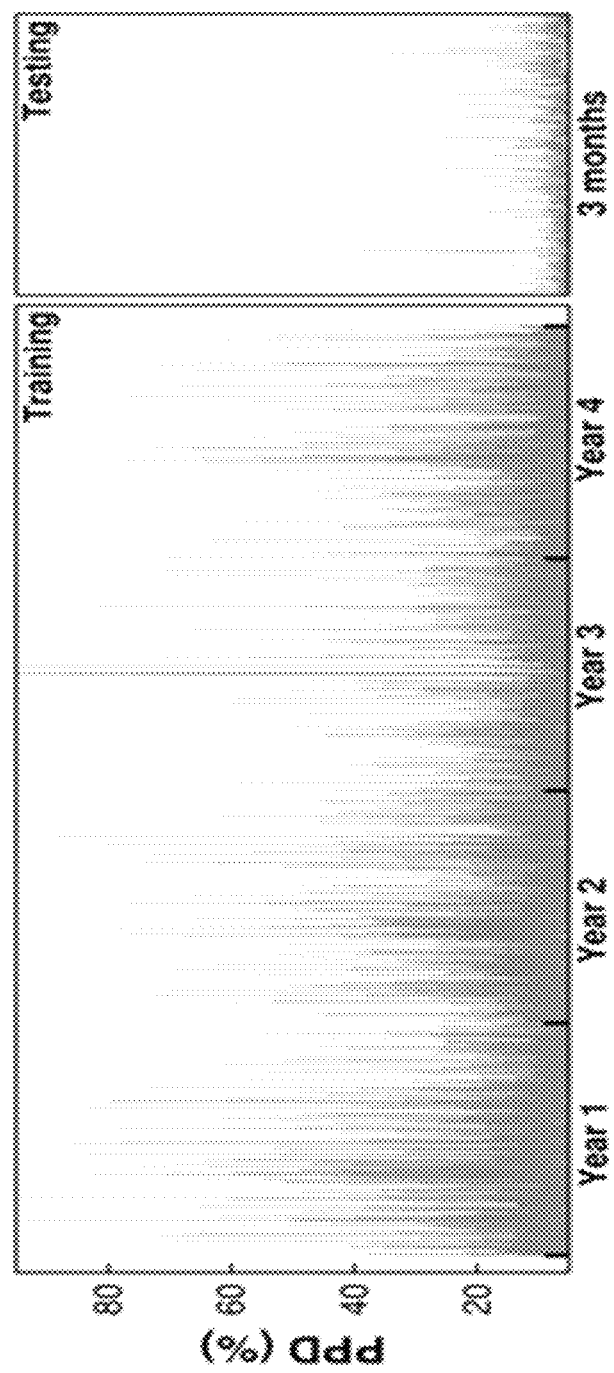
FIGS. 5A and 5B are graphical illustrations of comparative analysis of the system and the conventional DRL approach in providing occupant discomfort, in accordance with some embodiments of the present disclosure.
Figure 5B:
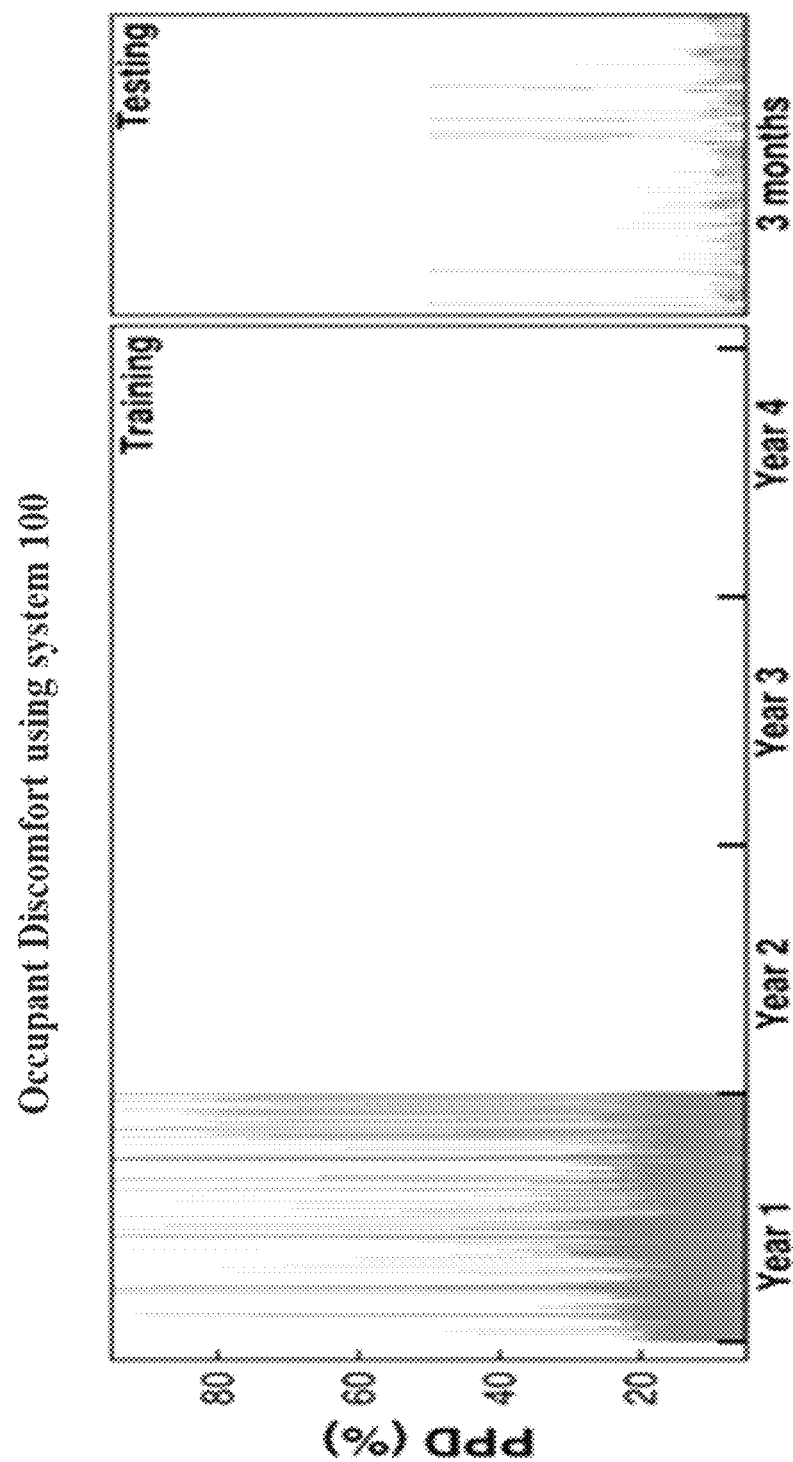

Solution structure: Typically, the DRL agent starts with exploration (high value of ∈) and over a period of time as ∈decays, the agent begins to exploit. FIG. 4A and FIG. 4B show the decision (flowrate) taken by the agent during training phase for BL2 (4 years) and the system 100. It is observed that initially flowrate oscillates frequently between the minimum (0 kg/s) and maximum (20 kg/s) values. A, the end of the training, as the DRL agent begins to exploit, fewer of these extreme values are picked and the optimal flowrates are mostly concentrated between [5, 15] kg/s. This is clear in FIGS. 4A and 4B for the testing period. FIGS. 5A and 5B show the PPD convergence during training and testing for BL2 (DRL approach) and the system 100. Again, due to the large oscillations in the actions taken by the DRL agent in the learning phase (FIGS. 4A and 4B), the PPD fluctuates significantly while learning. These fluctuations reduce as the training progresses. In the testing phase, we observe that the PPD settles mostly within a narrow band for both BL2 and the system 100. This shows that choice of the reward function and penalty is able to drive the solution in the right direction.

Figure 6:
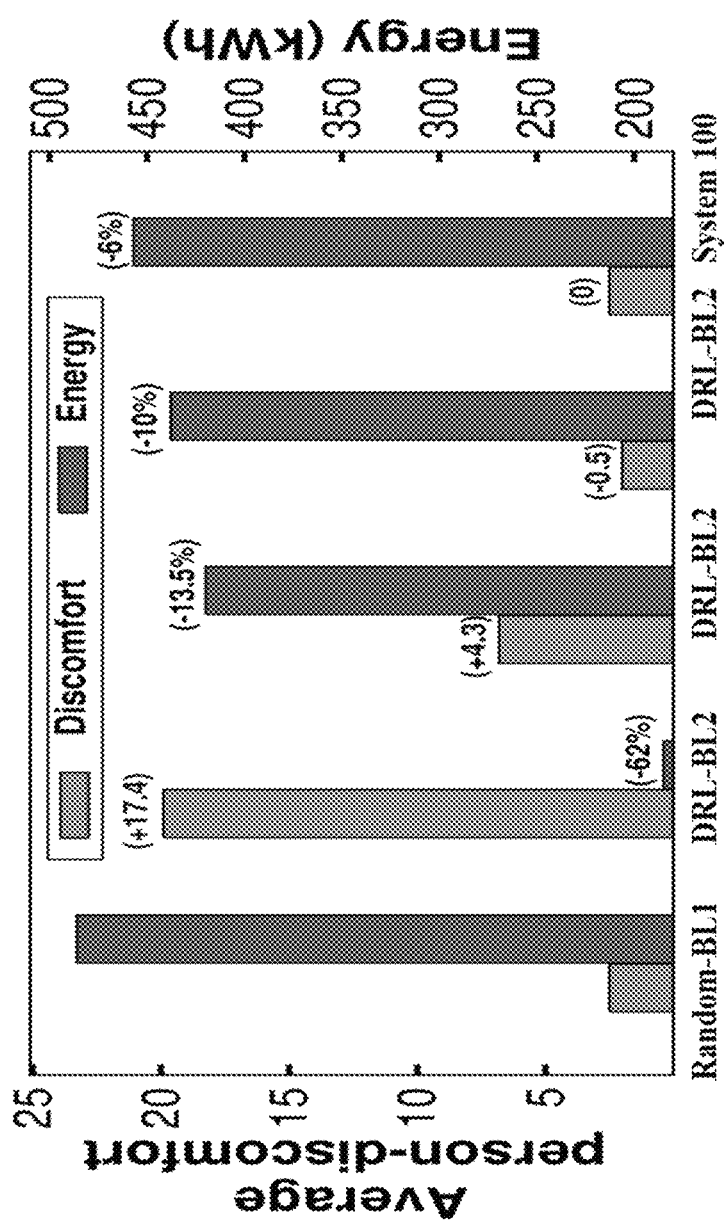
FIG. 6 is a graphical illustration depicting performance of the system against the conventional DRL approach with respect to energy consumption and occupant discomfort during the HVAC control, in accordance with some embodiments of the present disclosure.

Comparison with baselines: FIG. 6 compares the performance of the system 100 with the baselines. The X-axis represents the approach and primary (secondary) Y-axis represents the average person-discomfort (Energy in kWh). In FIG. 7, the numerical values on top of each bar for BL2s' and e system 100 prove indicate the increase or decrease in the average person discomfort and percentage change in EHVAC from BL1. Note that in BL1, a rule that satisfies the criterion or a random rule among the conflicting rules is picked. Due to random picking, metrics are averaged across five instances. BL1 results in an average person-discomfort of 2.5 and consumes 486 kWh energy over the three months testing period. Compared to BL1, BL2 (with 1 year training) performs poorly in terms of person discomfort (increases by 17.4) while consuming significantly lower energy. The lower energy consumption is a direct result of maintaining poor comfort. The poor performance of BL2 (1 year) is mainly due to insufficient training duration. As the training duration is increased, it is observed that BL2 keeps improving and better learns the optimal policy. Specifically, BL2 (2 years training) and BL2 (4 years training) significantly bring down the person-discomfort, compared with BL2 (1 year training). These findings are consistent with works in literature where the training duration in the order of few years have been reported to achieve good performance with DRL. Further, compared with BL1, BL2 (4 years training) marginally improves the average person-discomfort (by 0.5) and consumes 10% less energy. Finally, it is observed that the system 100 performs at par with BL2 (4 years training) in terms of average person-discomfort while consuming slightly more energy of 4%. However, the key advantage of the system 100 over BL2 (4 years training) is the significant reduction in the training duration (by 75%) to learn the optimal policy. This finding is particularly important when only a few training samples are available. Note that the system 100 has been trained over one year data, as discussed earlier. Besides, compared with BL1, the system 100 consumes 6% lower energy for the same average person-discomfort. In sum, (1) an informed decision making (BL2 and the system 100) helps to optimize energy and comfort in buildings (achieve energy savings for nearly the same or even marginally improve comfort), and (2) domain knowledge helps guide the learning process quickly to an optimal policy.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for an optimized Heating, Ventilation, and Air-conditioning (HVAC) control of a building, the method comprising:
   receiving, via an Expressive Decision Tables (EDT) engine executed by one or more hardware processors, a plurality of HVAC parameters of the building, measured for a current time instance (t), wherein the plurality of HVAC parameters comprises: (i) a return air temperature (RAT), (ii) an occupancy count (OpCnt), (iii) an outside air temperature (OAT), (iv) an occupant discomfort measured in terms of predicted percentage dissatisfied (PPD) metric, (v) a HVAC energy consumption ($E_{HVAC}$) and (vi) a current time, and wherein the occupant discomfort and the HVAC energy consumption ($E_{HVAC}$) are measured with respect to a previous action item ($a_{t-1}$) triggered at a previous time instant (t−1);

analyzing, by the EDT engine executed by the one or more hardware processors, the plurality of HVAC parameters in accordance with a rule set predefined for the HVAC control of the building to determine an action space ($A_t$) comprising more than one action items ($a_{t1}$ . . . $a_{tm}$) for the current time instance (t) corresponding to more than one rules that are satisfied from among the rule set, wherein the rule set is predefined in the EDT engine via a formal requirement specifier consumable by the EDT engine to capture domain knowledge of the building for the HVAC control, and wherein presence of more than one or more action items is indicative of presence of one or more conflicts in the domain knowledge;

receiving, by a Deep Reinforcement Learning (DRL) agent executed by the one or more hardware processors, the action space ($A_t$), a current state ($S_t$) of the building from the EDT engine, and a current reward ($R_t$) received by the DRL agent for the previous action item ($a_{t-1}$), wherein the current state ($S_t$) is represented by a state tuple {$OAT_t$, $RAT_t$, $OpCnt_t$, $\tau$} comprising one or more HVAC parameters from among the plurality of HVAC parameters, and $\tau$ representing time-of-day capturing time related variations in the one or more plurality of HVAC parameters; and selecting, by the DRL agent executed by the one or more hardware processors, an optimal control action item from among the action space ($A_t$) comprising the one or more action items ($a_{t1}$ . . . $a_{tm}$) that resolves the conflicts by maximizing a cumulative reward received over an episode, wherein a target cumulative reward is computed for current state action pair ($S_t$, $a_t$) providing an expected return over the episode starting from the current state $S_t$, following a policy, taking an action item $a_t$.

2. The method of claim 1, wherein the target cumulative reward comprises an immediate reward component and a component providing neural networks approximation of maximum cumulative reward that is expected from the next state that is $S_{(t+1)}$, wherein the immediate reward component is computed based on a consumption reward component ($R_C$) and an occupant discomfort component ($R_E$), wherein weightage of each component is defined by a tuning factor ($\alpha$) and the immediate award for a successive time instant $(_{t+1})$ is defined by $R_{t+1} = \alpha R_C + (1-\alpha) R_E$, and wherein the $R_C$ is based on ratio of the HVAC energy consumption ($E_{HVAC}$) computed for the successive time instant to a rated maximum HVAC energy consumption as a result of taking action $a_t$ to a rated maximum HVAC energy consumption, and the $R_E$ is based on the ration of the occupant discomfort for the successive time instant to a maximum allowed occupant discomfort as a result of taking action $a_t$ to a maximum allowed occupant discomfort.

3. The method of claim 1, wherein the DRL agent is trained using a deep Q-Network (DQN) for selecting the optimal control action by applying an iterative process using episodic-epoch based learning over a truncated action space (A), a state (S) and the immediate reward corresponding to action item (a) taken from a previous state received from the EDT engine, wherein the DQN approximates an action-value function (Q-value) for the state (S) in each iteration returning the expected cumulative discounted reward over an episode starting from the state (S), following the policy, taking the action item a, and wherein the control action by providing preference to a highest Q-value based on a ε-greedy policy, and wherein the iterative process is applied over two DQNs further comprising a policy network Q and a target network $\overline{Q}$ to choose action and approximate the target cumulative reward respectively.

4. The method of claim 1, wherein one or more rules in the rule set include a time based component.

5. A system for an optimized Heating, Ventilation, and Air-conditioning (HVAC) control of a building, the system comprising:
   a memory storing instructions;
   one or more Input/Output (I/O) interfaces; and
   one or more hardware processors coupled to the memory via the one or more I/O interfaces, wherein the one or more hardware processors are configured by the instructions to:
   receive, via an Expressive Decision Tables (EDT) engine executed by the one or more hardware processors a plurality of HVAC parameters of the building, measured for a current time instance (t), wherein the plurality of HVAC parameters comprising: (i) a return air temperature (RAT), (ii) an occupancy count (OpCnt), (iii) an outside air temperature (OAT), (iv) an occupant discomfort measured in terms of predicted percentage dissatisfied (PPD) metric, (v) a HVAC energy consumption ($E_{HVAC}$) and (vi) a current time, wherein the occupant discomfort and the HVAC energy consumption ($E_{HVAC}$) are measured with respect to a previous action item ($a_{t-1}$) triggered at a previous time instant (t−1);
   analyze, by the EDT engine, the plurality of HVAC parameters in accordance with a rule set predefined for the HVAC control of the building to determine an action space ($A_t$) comprising more than one action items ($a_{t1}$ . . . $a_{tm}$) for the current time instance (t) corresponding to more than one rules that are satisfied from among the rule set, wherein the rule set is predefined in the EDT engine via a formal requirement specifier consumable by the EDT engine to capture domain knowledge of the building for the HVAC control, and wherein presence of more than one or more action items is indicative of presence of one or more conflicts in the domain knowledge;
   receive, by a Deep Reinforcement Learning (DRL) agent executed by the one or more hardware processors, the action space ($A_t$), a current state ($S_t$) of the building from the EDT engine, and a current reward ($R_t$) received by the DRL agent for the previous action item ($a_{t-1}$), wherein the current state ($S_t$) is represented by a state tuple {$OAT_t$, $RAT_t$, $OpCnt_t$, $\tau$} comprising one or more HVAC parameters from among the plurality of HVAC parameters, and $\tau$ representing time-of-day capturing time related variations in the one or more plurality of HVAC parameters; and
   select, by the DRL agent, an optimal control action item from among the action space ($A_t$) comprising the one or more action items ($a_{t1}$ . . . $a_{tm}$) that resolves the conflicts by maximizing a cumulative reward received over an episode, wherein a target cumulative reward is computed for current state action pair ($S_t$, $a_t$) providing an expected return over the episode starting from the current state $S_t$, following a policy, taking an action item $a_t$.

6. The system of claim 5, wherein the target cumulative reward comprises an immediate reward component and a component providing neural networks approximation of maximum cumulative reward that is expected from the next state that is $S_{(t+1)}$, wherein the immediate reward component is computed based on a consumption reward component ($R_C$) and an occupant discomfort component ($R_E$), wherein weightage of each component is defined by a tuning factor ($\alpha$) and the immediate award for a successive time instant ($_{t+1}$) is defined by $R_{t+1} = \alpha R_C + (1-\alpha) R_E$, and wherein the $R_C$ is based on ratio of the HVAC energy consumption ($E_{HVAC}$) computed for the successive time instant to a rated maximum HVAC energy consumption as a result of taking action $a_t$ to a rated maximum HVAC energy consumption, and the $R_E$ is based on the ration of the occupant discomfort for the successive time instant to a maximum allowed occupant discomfort as a result of taking action $a_t$ to a maximum allowed occupant discomfort.

7. The system of claim 5, wherein the DRL agent is trained using a deep Q-Network (DQN) for selecting the optimal control action by applying an iterative process using episodic-epoch based learning over an truncated action space (A), a state (S) and the immediate reward corresponding to action item (a) taken from a previous state received from the EDT engine, wherein the DQN approximates an action-value function (Q-value) for the state (S) in each iteration returning the expected cumulative discounted reward over an episode starting from the state (S), following the policy, taking the action item a, and wherein the control action by providing preference to a highest Q-value based on a $\varepsilon$-greedy policy, and wherein the iterative process is applied over two DQNs comprising a policy network Q and a target network $\overline{Q}$ to choose action and approximate the target cumulative reward respectively.

8. The system of claim 5, wherein one or more rules in the rule set include a time based component.

9. One or more non-transitory machine-readable information storage mediums comprising one or more instructions which when executed by one or more hardware processors cause:

receiving, via an Expressive Decision Tables (EDT) engine executed by one or more hardware processors, a plurality of HVAC parameters of the building, measured for a current time instance (t), wherein the plurality of HVAC parameters comprising: (i) a return air temperature (RAT), (ii) an occupancy count (OpCnt), (iii) an outside air temperature (OAT), (iv) an occupant discomfort measured in terms of predicted percentage dissatisfied (PPD) metric, (v) a HVAC energy consumption ($E_{HVAC}$) and (vi) a current time, wherein the occupant discomfort and the HVAC energy consumption ($E_{HVAC}$) are measured with respect to a previous action item ($a_{t-1}$) triggered at a previous time instant (t−1);

analyzing, by the EDT engine executed by the one or more hardware processors, the plurality of HVAC parameters in accordance with a rule set predefined for the HVAC control of the building to determine an action space ($A_t$) comprising more than one action items ($a_{t1}$ ... $a_{tn}$) for the current time instance (t) corresponding to more than one rules that are satisfied from among the rule set, wherein the rule set is predefined in the EDT engine via a formal requirement specifier consumable by the EDT engine to capture domain knowledge of the building for the HVAC control, and wherein presence of more than one or more action items is indicative of presence of one or more conflicts in the domain knowledge;

receiving, by a Deep Reinforcement Learning (DRL) agent executed by the one or more hardware processors, the action space ($A_t$), a current state ($S_t$) of the building from the EDT engine, and a current reward ($R_t$) received by the DRL agent for the previous action item ($a_{t-1}$), wherein the current state ($S_t$) is represented by a state tuple {$OAT_t$, $RAT_t$, $OpCnt_t$, $\tau$} comprising one or more HVAC parameters from among the plurality of HVAC parameters, and $\tau$ representing time-of-day capturing time related variations in the one or more plurality of HVAC parameters; and selecting, by the DRL agent executed by the one or more hardware processors, an optimal control action item from among the action space ($A_t$) comprising the one or more action items ($a_{t1}$ ... $a_{tn}$) that resolves the conflicts by maximizing a cumulative reward received over an episode, wherein a target cumulative reward is computed for current state action pair ($S_t$, $a_t$) providing an expected return over the episode starting from the current state $S_t$, following a policy, taking an action item $a_t$.

10. The one or more non-transitory machine-readable information storage mediums of claim 9, wherein the target cumulative reward comprises an immediate reward component and a component providing neural networks approximation of maximum cumulative reward that is expected from the next state that is $S_{(t+1)}$, wherein the immediate reward component is computed based on a consumption reward component ($R_C$) and an occupant discomfort component ($R_E$), wherein weightage of each component is defined by a tuning factor ($\alpha$) and the immediate award for a successive time instant ($_{t+1}$) is defined by $R_{t+1} = \alpha R_C + (1-\alpha) R_E$, and wherein the $R_C$ is based on ratio of the HVAC energy consumption ($E_{HVAC}$) computed for the successive time instant to a rated maximum HVAC energy consumption as a result of taking action $a_t$ to a rated maximum HVAC energy consumption, and the $R_E$ is based on the ration of the occupant discomfort for the successive time instant to a maximum allowed occupant discomfort as a result of taking action $a_t$ to a maximum allowed occupant discomfort.

11. The one or more non-transitory machine-readable information storage mediums of claim 9, wherein the DRL agent is trained using a deep Q-Network (DQN) for selecting the optimal control action by applying an iterative process using episodic-epoch based learning over an truncated action space (A), a state (S) and the immediate reward corresponding to action item (a) taken from a previous state received from the EDT engine, wherein the DQN approximates an action-value function (Q-value) for the state (S) in each iteration returning the expected cumulative discounted reward over an episode starting from the state (S), following the policy, taking the action item a, and wherein the control action by providing preference to a highest Q-value based on a $\varepsilon$-greedy policy, and wherein the iterative process is applied over two DQNs comprising a policy network Q and a target network $\overline{Q}$ to choose action and approximate the target cumulative reward respectively.

12. The one or more non-transitory machine-readable information storage mediums of claim 9, wherein one or more rules in the rule set include a time based component.

* * * * *